(12) United States Patent
Tirilly et al.

(10) Patent No.: US 9,013,258 B2
(45) Date of Patent: Apr. 21, 2015

(54) RECTIFIER TRANSFORMER

(75) Inventors: Serge Tirilly, Massy (FR); Triomphant Ngneguen, Sevres (FR); David Marnay, Orsay (FR)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/976,884

(22) PCT Filed: Dec. 27, 2011

(86) PCT No.: PCT/EP2011/074064
§ 371 (c)(1),
(2), (4) Date: Jun. 27, 2013

(87) PCT Pub. No.: WO2012/089717
PCT Pub. Date: Jul. 5, 2012

(65) Prior Publication Data
US 2013/0278368 A1 Oct. 24, 2013

(30) Foreign Application Priority Data
Dec. 30, 2010 (FR) ...................... 10 61378

(51) Int. Cl.
| H01F 30/12 | (2006.01) |
| H01F 27/24 | (2006.01) |
| H01F 17/06 | (2006.01) |
| H02M 7/757 | (2006.01) |
| G05F 1/33 | (2006.01) |
| H01F 27/28 | (2006.01) |
| H01F 27/40 | (2006.01) |
| H01F 29/14 | (2006.01) |
| H02M 7/06 | (2006.01) |

(52) U.S. Cl.
CPC ............ *H01F 27/2847* (2013.01); *H01F 27/40* (2013.01); *H01F 29/146* (2013.01); *H01F 2027/408* (2013.01); *H02M 7/068* (2013.01)

(58) Field of Classification Search
USPC .......... 336/5, 175–177, 212; 363/68, 126, 81, 363/82; 323/359
See application file for complete search history.

(56) References Cited

U.S. PATENT DOCUMENTS

| 2,918,616 A | 12/1959 | Diebold |
| 3,085,188 A | 4/1963 | Drabeck |
| 3,173,061 A | 3/1965 | Storsand |
| 3,368,137 A * | 2/1968 | Stevens et al. .................. 363/82 |
| 4,338,657 A * | 7/1982 | Lisin et al. ...................... 363/68 |

FOREIGN PATENT DOCUMENTS

EP 0 053 691 A1 6/1982

OTHER PUBLICATIONS

International Search Report, PCT/EP2011/074064, dated Jan. 31, 2012.

* cited by examiner

*Primary Examiner* — Mangtin Lian
(74) *Attorney, Agent, or Firm* — Nixon Peabody LLP (57) ABSTRACT

A rectifier transformer including at least one secondary with windings, one pair of magnetic transductors per winding, one of the transductors having one or more first busbars and the other having one or more second busbars. All of the busbars of the pair of transductors are connected to the same winding. The or each first or second, busbar is connected to a single positive or negative, terminal (2w+) designed to be connected to a positive or negative, arm of the rectifier. All of the busbars of the pair of magnetic transductors form one or more groups that are encircled by at least one magnetic toroid and that comprise at least one first busbar and at least one second busbar, so that, when the terminals are short-circuited, the busbars of a group pass currents of opposite directions such that the sum of the currents in one direction is equal to the sum of the currents in the other direction.

12 Claims, 8 Drawing Sheets

(PRIOR ART)

FIG. 1F

(PRIOR ART)

RECTIFIER TRANSFORMER

CROSS REFERENCE TO RELATED APPLICATIONS OR PRIORITY CLAIM

This application is a National Phase of PCT/EP2011/074064, filed Dec. 27, 2011, entitled, "TRANSFORMER-RECTIFIER UNIT", which claims the benefit of French Patent Application No. 10 61378, filed Dec. 30, 2010, the contents of which are incorporated herein by reference in their entirety.

TECHNICAL FIELD

The present invention relates to a rectifier transformer for a high-power rectifier circuit that is usable, in particular, for powering loads with direct current (DC), such loads being, for example, lines of aluminum electrolysis pots. By way of indication, the pots in which electrolysis of aluminum takes place pass DC that is of very high magnitude, of the order of 350,000 amps (A) for a voltage of 4 volts (V), a large number of pots being powered in series. Such a high-power rectifier circuit could naturally be used to power loads other than electrolysis pots, e.g. electric arc furnaces or plasma generators that also require high power. By way of example, for an electrolysis plant having 200 pots connected in series, and fed with a current of 300,000 A under a voltage of 4 V, i.e. 800 V for the electrolysis series, power of 250 megawatts (MW) is necessary. In all, the plant needs power of 300 MW if the ancillary needs, in particular for baking the anodes and casting, are included. Such power corresponds to about one third of the power generated by a nuclear power plant unit, i.e. to an enormous amount of power.

STATE OF THE PRIOR ART

It is recalled that a transformer has at least two windings, including at least one primary and at least one secondary, it being possible for the windings to be connected, for example, in a delta configuration or in a star configuration if they are three-phase windings. In this application, the primary of the transformer is designed to be connected to the electricity network or "grid", generally via an adjustment transformer or "tap changer" transformer. The secondary of the transformer serves to be connected to a rectifier of the Graetz bridge type having semiconductors via magnetic transductors or "saturable reactors". In this context, magnetic transductors are devices by means of which it is possible to cause the DC voltage at the outlet of the rectifier to vary via an independent current, by using the saturation phenomena of the magnetic circuit. Such magnetic transductors make it possible to cause the DC outlet voltage to vary very rapidly but with a limited amplitude, large amplitudes being adjusted by the adjustment transformer, but more slowly and by successive taps.

Figure 1A:
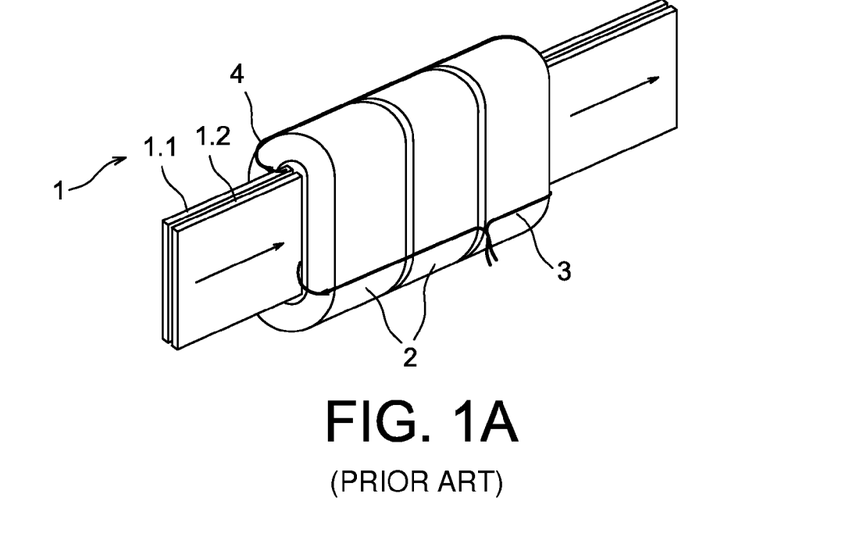
FIGS. 1A and 1B show examples of known magnetic transductors.
Figure 1B:
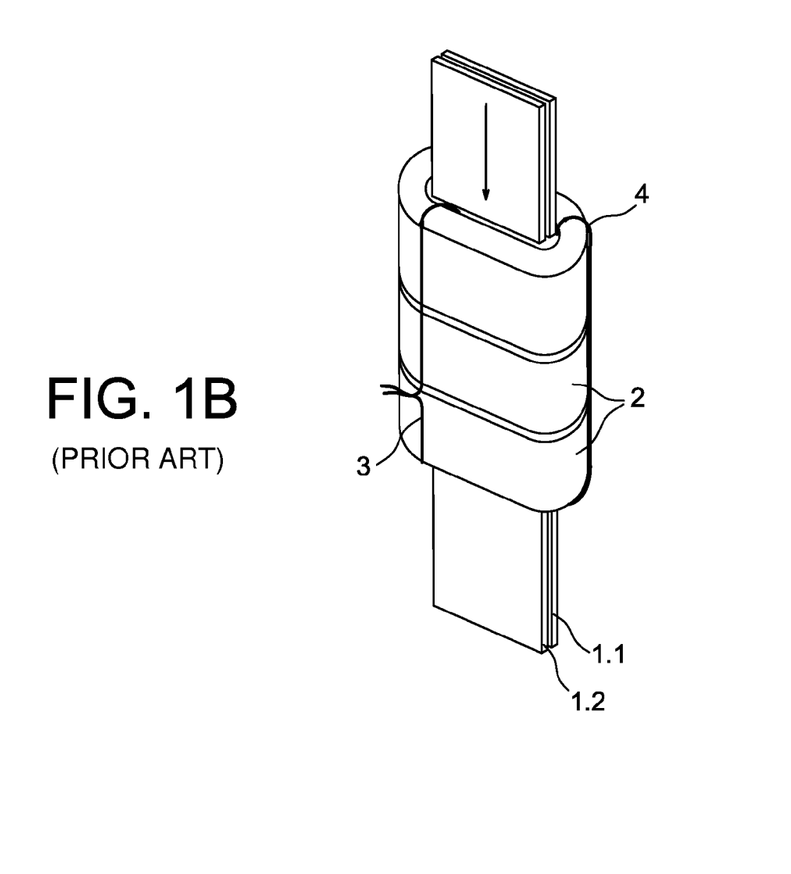

FIGS. 1A and 1B show an example of a magnetic transductor. In FIG. 1A, it is extending horizontally, and in FIG. 1B, it is extending vertically. A magnetic transductor includes a set 1 of busbars 1.1, 1.2. That set 1 is designed to be connected between a secondary winding of the transformer and a positive or negative outlet connection terminal designed to be connected to a positive or negative arm of the rectifier (not shown in FIGS. 1A and 1B). The busbars 1.1, 1.2 of a set 1 are connected in parallel. They are generally made of copper. One or more magnetic toroids 2 are threaded around the set of busbars 1. The magnetic transductor also has one or more electric circuits, including a control electric circuit 3 for adjusting the DC voltage. That control electric circuit 3 is in the form of at least one conductive control loop or turn that encircles the magnetic toroids 2. The magnetic transductor of the example shown in FIGS. 1A and 1B further includes a premagnetization electric circuit 4 in the form of at least one conductive turn also encircling the magnetic toroids 2. Adjustable direct currents are caused to flow through those circuits.

The windings of the transformer are placed in a tank 8 that is filled with a dielectric fluid such as a dielectric oil acting both as an electrical insulator and as a cooling fluid. The magnetic transductors 1 are placed in the tank 8 of the transformer with the windings. In the FIG. 1, only the secondary 5 of the transformer is shown, and not the primary, so as not to clutter the figures. The busbar end that is to be connected to the rectifier comes into electrical contact with an outlet connection terminal 2w−, 2w+, 2v−, 2v+, 2u−, 2u+ accessible from the outside of the tank 8, that connection terminal being equipped in conventional manner with a dielectric bushing passing through a wall 8.1 of the tank 8 of the transformer.

Figure 1C:
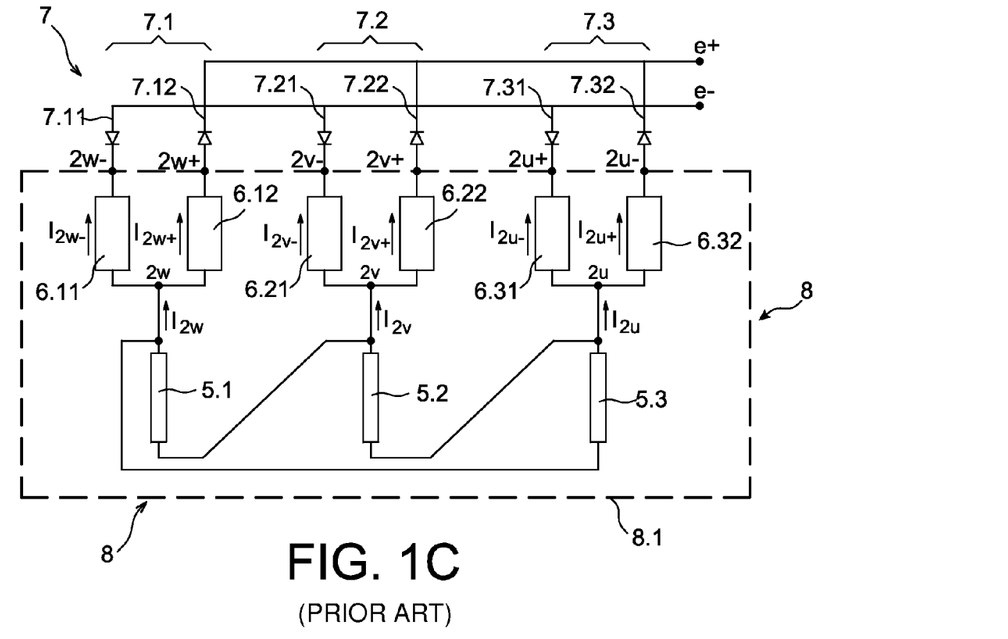
FIGS. 1C and 1D diagrammatically show how the secondary windings, the magnetic transductors, and the rectifier are connected in a known rectifier transformer.

FIG. 1C shows an electric circuit showing the arrangement of the secondary windings 5.1, 5.2, 5.3, of the magnetic transductors 6.11, 6.12, 6.21, 6.22, 6.31, 6.32 and of the rectifier 7. A transformer is shown in which the secondary 5 is three-phase and has three windings 5.1, 5.2, 5.3 connected in a delta configuration in which the three vertices of the delta correspond to phase terminals 2u, 2v, 2w to be connected to the magnetic transductors 6.11, 6.12, 6.21, 6.22, 6.31, 6.32. The magnetic transductors 6.11, 6.12, 6.21, 6.22, 6.31, 6.32 are shown diagrammatically as rectangles, and neither the busbars nor the magnetic toroids are shown.

Each of the phase terminals 2u, 2v, 2w corresponds to at least one end of a secondary winding 5.1, 5.2, 5.3, e.g. in a delta coupling, the ends of the winding 5.1 correspond to the phase terminals 2w, 2v, the ends of the winding 5.2 correspond to the phase terminals 2v, 2u, and the ends of the winding 5.3 correspond to the phase terminals 2u, 2w.

Each phase terminal 2u, 2v, 2w is connected to two magnetic transductors. The phase terminal 2u is connected to the magnetic transductors 6.11, 6.12. The phase terminal 2v is connected to the magnetic transductors 6.21, 6.22. The phase terminal 2w is connected to the magnetic transductors 6.31, 6.32.

The rectifier 7 includes a certain number of pairs 7.1, 7.2, 7.3 of arms, each of which includes a semiconductor rectifier component D1, D2, D3, D4, D5, D6.

In FIG. 1C, only one half of the rectifier 7 is shown as explained below.

In a pair 7.1, 7.2, 7.3 of arms, there is a "positive" arm 7.12, 7.22, 7.32 and a "negative" arm 7.11, 7.21, 7.31. All of the positive arms 7.12, 7.22, 7.32 are connected to the same positive terminal e+ and all of the negative arms 7.11, 7.21, 7.31 are connected to the same negative terminal e−, the DC outlet voltage being accessible between the positive terminal e+ and the negative terminal e−. The load to be powered with DC is connected between the positive terminal e+ and the negative terminal e− of the rectifier 7.

The rectifier bridges are diode bridges, thereby guaranteeing reliability and robustness. Each secondary winding 5.1, 5.2, 5.3 has an end 2w, 2v, 2u connected firstly to a negative arm 7.11, 7.21, 7.31 of the rectifier 7 and secondly to a positive arm 7.12, 7.22, 7.32 of the rectifier 7.

Reference 2w− designates a negative outlet connection terminal connected to the magnetic transductor 6.11. When the rectifier 7 is connected to the transformer, the negative arm 7.11 of the rectifier is connected to said negative outlet connection terminal 2w−. Reference 2w+ designates a positive outlet connection terminal connected to the magnetic transductor 6.12. When the rectifier 7 is connected to the transformer, the negative arm 7.12 of the rectifier is connected to said positive outlet connection terminal 2w+.

Likewise, reference 2v− designates a negative outlet connection terminal connected to the magnetic transductor 6.21. When the rectifier 7 is connected to the transformer, the negative arm 7.21 of the rectifier is connected to said negative outlet connection terminal 2v−.

Terminal 2v+ is a positive outlet connection terminal connected to the magnetic transductor 6.22. When the rectifier 7 is connected to the transformer, the positive arm 7.22 of the rectifier is connected to said positive outlet connection terminal 2v+.

Likewise, reference 2u− designates a negative outlet connection terminal connected to the magnetic transductor 6.31. When the rectifier 7 is connected to the transformer, the negative arm 7.31 of the rectifier is connected to said negative outlet connection terminal 2u−.

Terminal 2u+ is a positive outlet connection terminal connected to the magnetic transductor 6.32. When the rectifier 7 is connected to the transformer, the positive arm 7.32 of the rectifier is connected to said positive outlet connection terminal 2u+.

These outlet connection terminals 2w+, 2w−, 2v+, 2v−, 2u+, 2u− are disposed on a wall 8.1 of the tank 8 of the transformer, which wall is shown diagrammatically by dashed lines. Said outlet connection terminals 2w+, 2w−, 2v+, 2v−, 2u+, 2u− are placed outside the tank so that the rectifier 7 can be connected.

In this application, the transformer generally includes two three-phase primaries (not shown) and two three-phase secondaries, only one of them being shown. The rectifier 7 is then a twelve-phase rectifier bridge made up of two six-phase elementary rectifiers connected in parallel and each secondary is connected to an elementary six-phase rectifier. It is this elementary six-phase rectifier that is shown.

A phase terminal 2u, 2v, 2w is thus connected to the arms of a pair 7.3, 7.1, 7.2 via a pair of magnetic transductors. The magnetic transductors of a pair, e.g. 6.11, 6.12 are connected on one side to the same phase terminal 2w and on the other side to the positive and negative rectifier arms 7.11, 7.12 of the same pair 7.1.

Figure 1D:
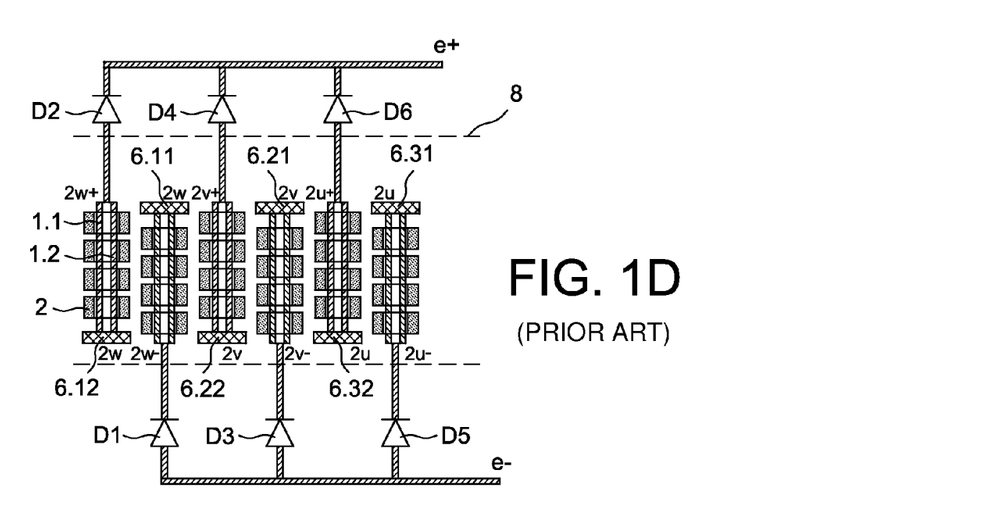

FIG. 1D shows in more detail the magnetic transductors 6.11, 6.12, 6.21, 6.22, 6.31, 6.32 and how they are connected in the rectifier 7. It can be seen clearly for each magnetic transductor 6.11, 6.12, 6.21, 6.22, 6.31, 6.32, that a set of two busbars 1.1, 1.2 are connected in parallel, one of the ends of the set being to be connected to an arm of the rectifier via an outlet connection terminal 2w+, 2w−, 2v+, 2v−, 2u+, 2u and the other end being to be connected to at least one winding of the secondary 5.1, 5.2, 5.3 at a phase terminal 2w, 2v, 2u. Four magnetic toroids 2 are shown per set of busbars 1.1, 1.2, i.e. per magnetic transductor.

In the transformer, the sets of busbars may be mounted horizontally or vertically.

Figure 1E:
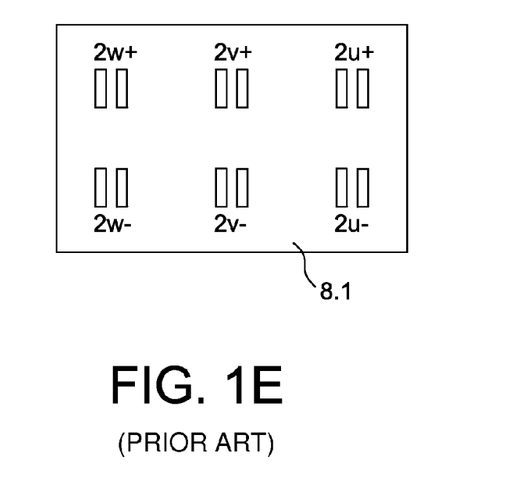
FIG. 1E is a face view of a wall of the known rectifier transformer.

FIG. 1E shows a face view of a wall 8.1 of the tank, this wall 8.1 being equipped with six outlet connection terminals 2u+, 2u−, 2v+, 2v−, 2w+, 2w− that are connected to the magnetic transductors. The arms of the rectifier come to connect to said outlet connection terminals.

The negative outlet connection terminals 2u−, 2v−, 2w− designed to be connected to the negative arms of the rectifier are in the lower portion of the wall 8.1 and the positive outlet connection terminals 2u+, 2v+, 2w+ designed to be connected to the positive arms of the rectifier are in the upper portion of the wall 8.1.

With such an arrangement of the outlet connection terminals 2u−, 2v−, 2w− and 2u+, 2v+, 2w+, the magnetic transductors 6.11, 6.12 designed to be connected to the same phase terminal 2w, 2v, 2u are arranged top-to-tail, with, for one of the magnetic transductors referenced 6.12, the end connected to the positive outlet connection terminal 2w+ pointing upwards, and, for the other magnetic transductor 6.11, the end connected to the negative outlet connection terminal 2w− pointing downwards.

Figure 1F:
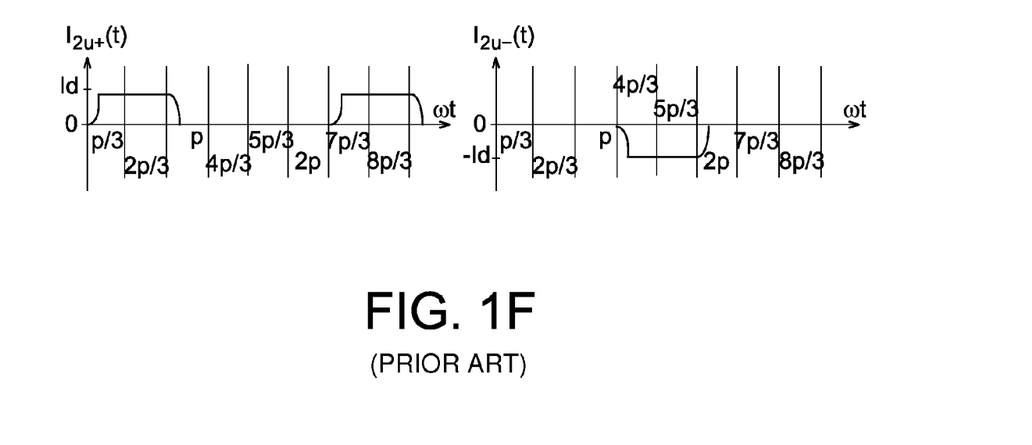
FIG. 1F shows a timing diagram of the current flowing through the busbars of the magnetic transductors associated with the phase u of the secondary of the known rectifier transformer.

FIG. 1F shows, in the form of a timing diagram, for the phase u, the current $I_{2u+}(t)$ and $I_{2u-}(t)$ flowing in the two sets of busbars of the magnetic transductors 6.31, 6.32 connected to the same phase terminal 2u, while the rectifier is operating. For a third of a period, each magnetic transductor 6.31, 6.32 sees one-directional current that is almost rectangular of modulus +Id, −Id.

The currents are in the same direction in the busbars of the same magnetic transductor, whereas they are in opposite directions in the two magnetic transductors connected to the same secondary winding.

Above a certain magnitude of DC Id of about 5 kiloamps (kA), the voltage drop generated by the set of magnetic transductors no longer depends on said magnitude of current.

The transformers are subjected to performance and conformity tests, including short-circuit tests that make it possible to determine their short-circuit characteristics, in particular their short-circuit impedances, their short-circuit losses, and their short-circuit heating, from which their load characteristics are deduced. The conditions of such short-circuit tests are described in particular in standard IEC 60076-1, paragraph 10.4.

During those short-circuit tests, the outlet connection terminals 2u+, 2u−, 2v+, 2v−, 2w+, 2w− are short-circuited, i.e. they are all connected together.

During the short-circuit tests, when the short-circuit voltage is applied to the primary of the transformer, the nominal currents are assumed to be flowing through the primary and secondary windings of the transformer and through the busbars of the magnetic transductors. The short-circuit voltage and the resulting currents should be substantially sinusoidal, but then in the busbars of a magnetic transductor, i.e. in a set of busbars encircled by the same magnetic toroid, the currents flow in the same direction and their magnetic effects on the magnetic toroids add together to generate additional impedance and large current and voltage harmonics that distort the short-circuit loss and impedance measurements, or indeed prevent such measurements being made.

The presence of the magnetic transductors in the tank of the transformer thus distorts the results of the short-circuit tests that are specific to the active portions of the transformers, i.e. to its windings and to their cores. During the testing, short-circuit loss and impedance are measured for a pair of primary-secondary windings by applying appropriate substantially sinusoidal voltage to the winding of the primary in order to obtain the current assigned to the transformer, the winding of the secondary being short-circuited. Because of the presence of the magnetic toroids, the measured value is higher than the value that would be obtained for the transformer alone. In addition, the magnetic toroids generate voltage and current harmonics that pollute the measurements.

One of the methods aimed at performing short-circuit tests on the transformer requires additional test equipment such as capacitor banks that are correctly dimensioned for compensating additional reactive power generated by the presence of magnetic toroids, and measurement instruments suitable for measuring the current and voltage harmonic components generated by the presence of the magnetic toroids. In addition, with that method, the short-circuit impedance and the short circuit losses are not measured at the nominal frequency under approximately sinusoidal voltage as required by standard IEC 60076-1, paragraph 10.4. The measurement is indirect, the effects of the harmonics are assessed by computing on the basis of the measurements taken, and the additional impedance generated by the magnetic toroids of the magnetic transductors is extrapolated. The measured values are then corrected for those extrapolated magnitudes in order to obtain the looked for results.

On the basis of all of the transformers of a series that are to be used in the same installation, and in the workshop, while the windings are out of the tank and dry, and under reduced feed current injected into the primary, the other method consists in measuring the short-circuit losses and the short-circuit impedance of the primary-secondary winding pair, and in placing only one of the transformers completely assembled but without the magnetic transductors on a testing platform for subjecting it to short-circuit tests performed in compliance with paragraph 10.4 of standard IEC 60076-1. The difference obtained for that equipment between the measurements taken out of the tank and on the testing platform is then added to the measurement results of the other transformers taken dry and out of the tank in order to obtain the looked for results.

That second method is time-consuming and costly. The measurements taken systematically outside the tank and dry for all of the transformers disrupt operation of the workshops.

The transformer that is subjected to the tests on the platform must then return to the workshop to be emptied of its dielectric fluid, taken out of the tank in order to enable the magnetic transductors to be mounted, placed in a vapor-phase oven for drying, then put back into the tank, which then needs to be filled again. The transformer can then, once again, be presented to the testing platform for other normative testing. All of those operations are costly in terms of labor, but the main cost results from the additional congestion caused at the testing platform which, in the process of manufacturing power transformers, already constitutes a bottleneck.

SUMMARY OF THE INVENTION

An object of the invention is to propose a rectifier transformer equipped with magnetic transductors, which transductors have no or almost no influence on the short-circuit impedance and short-circuit loss measurements for the transformer alone, those measurements are taken once the transformer is fully assembled in the tank and is equipped with the magnetic transductors having magnetic toroids.

Another object of the invention is to propose a transformer for a rectifier, which transformer is equipped with magnetic transductors having magnetic toroids and is easy and quick to short-circuit test once it is fully assembled in the tank, without requiring much labor.

Another object of the invention is to propose a transformer for a rectifier, which transformer is equipped in its tank with magnetic transductors and is suitable for undergoing tests for determining its short-circuit impedance and its short-circuit losses, while also complying with the recommendations of international standard IEC 60076-1, paragraph 10.4.

To achieve these objects, the invention provides, more precisely, a rectifier transformer including, in a tank, at least one primary, at least one secondary with phase windings, one pair of magnetic transductors per phase winding, one of the transductors having one or more first busbars and the other having one or more second busbars. All of the first and second busbars of the pair of magnetic transductors are connected via one end to the same phase winding, the or each first busbar being connected via another end to a single positive outlet connection terminal designed to be connected to a positive arm of the rectifier, the or each second busbar being connected via another end to a single negative outlet connection terminal designed to be connected to a negative arm of the rectifier. All of the busbars of the pair of magnetic transductors form one or more groups, each group being encircled by a magnetic toroid, or by a set of magnetic toroids and comprising one or more first busbars and one or more second busbars in such a manner that when the outlet connection terminals are short-circuited and when the transformer is being fed with alternating current (AC) via its primary, the busbars of a group pass currents of opposite directions such that the current or the sum of the currents in one direction is substantially equal to the current or to the sum of the currents in the other direction.

When there are a plurality of first busbars and/or a plurality of second busbars in the pair of magnetic transductors, the first busbars are connected in parallel and/or the second busbars are connected in parallel.

In the pair of magnetic transductors, the number of first busbars is not necessarily equal to the number of second busbars, but it is preferably equal thereto.

In a group of busbars encircled by a magnetic toroid or by a set of magnetic toroids, the first busbars may be closer to said magnetic toroid or to the magnetic toroids of said set of magnetic toroids than the or each second busbar.

In a group of busbars encircled by a magnetic toroid or by a set of magnetic toroids, the second busbars encircled by said magnetic toroid or by said set of magnetic toroids may be closer to said magnetic toroid or to the magnetic toroids of said set of magnetic toroids than the or each first busbar.

In a variant, a first busbar or a second busbar of a group is interposed between two second busbars or two first busbars of the group.

It is possible for two first busbars or two second busbars of the same magnetic transductor to be encircled by distinct magnetic toroids or by distinct sets of magnetic toroids.

When there are three windings in the secondary, they may be connected in a delta configuration or in a star configuration.

For improving the compactness of the tank of the transformer, it is preferable for the or each first busbar and for the or each second busbar to be arranged substantially vertically in the tank. Naturally, it is possible for them to be arranged substantially horizontally in the tank.

At least one conductive control loop surrounds the magnetic toroid or all of the magnetic toroids of the set of magnetic toroids.

At least one conductive premagnetization loop surrounds the magnetic toroid or all of the magnetic toroids of the set of magnetic toroids.

BRIEF DESCRIPTION OF THE DRAWINGS

The present invention can be better understood on reading the following description of embodiments, given merely by way of non-limiting indication and with reference to the accompanying drawings, in which.

Identical, similar, or equivalent portions of the various figures described below bear like numerical references in such a manner as to facilitate going from one figure to another.

The various portions shown in the figures are not necessarily shown at a uniform scale, in order to make the figures clearer.

DETAILED DESCRIPTION OF PARTICULAR EMBODIMENTS

Figure 2A:
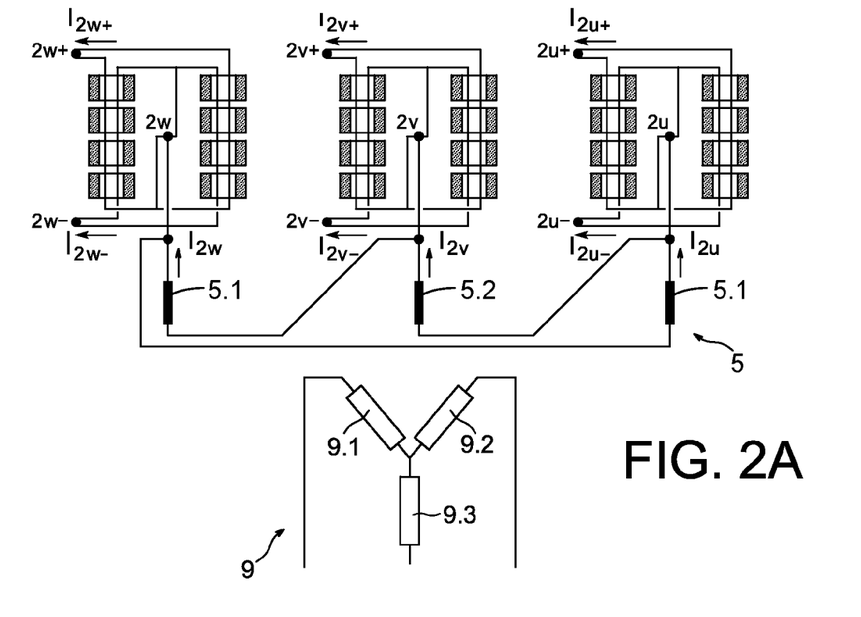
FIGS. 2A and 2B diagrammatically show how the secondary windings, the magnetic transductors, and the rectifier are connected in a rectifier transformer of the invention.

Reference is made below to FIG. 2A that shows a first example of a transformer of the invention that is equipped with magnetic transductors. FIG. 2A shows both a primary referenced 9 and a secondary 5 of the transformer. The primary 9 is formed of three windings 9.1, 9.2, 9.3 arranged in a star configuration. The secondary 5 is made up of three phase windings 5.1, 5.2, 5.3 arranged in a delta configuration.

Figure 2B:
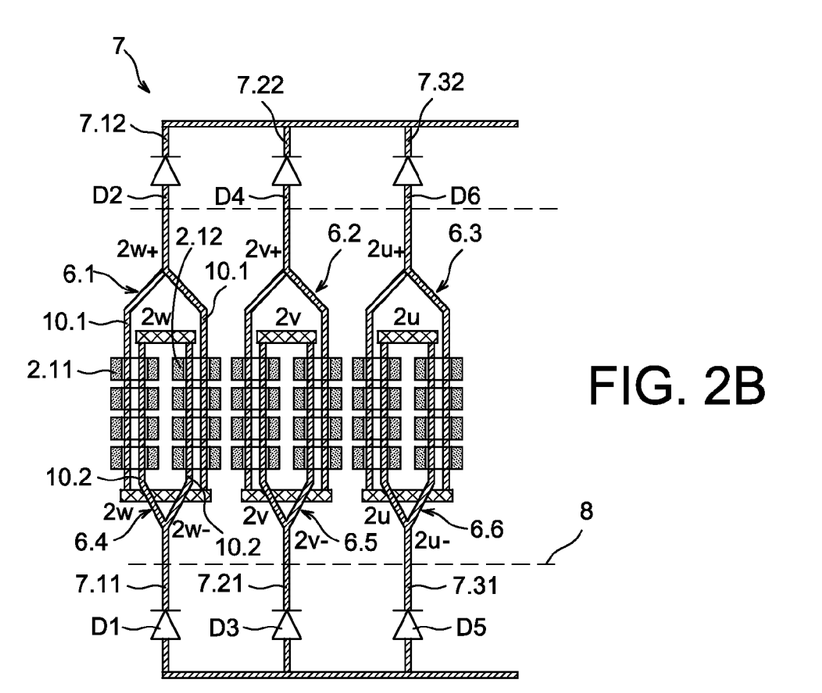

FIG. 2B shows the magnetic transductors 6.1 to 6.6 with which the transformer of the invention is equipped, and the rectifier 7 to which said transformer is connected. The tank 8 that contains the windings 9, 5 of the transformer and the magnetic transductors 6.1, 6.2, 6.3, 6.4, 6.5, 6.6 is shown diagrammatically by dashed lines.

The three vertices of the delta of the secondary windings 5.1, 5.2, 5.3 correspond to the phase terminals 2u, 2v, 2w to be connected to the magnetic transductors 6.1 to 6.6. Each of the terminals 2u, 2v, 2w corresponds to a respective end of a secondary winding 5.1, 5.2, 5.3. Thus, the ends of the winding 5.1 correspond to the terminals 2w, 2v, the ends of the winding 5.2 correspond to the terminals 2v, 2u, and the ends of the winding 5.3 correspond to the terminals 2u, 2w. In a variant, the secondary windings could have been arranged in a star configuration as shown in FIG. 3B.

Each terminal 2u, 2v, 2w is connected to a pair of magnetic transductors 6.1, 6.2, 6.3, 6.4, 6.5, 6.6, i.e. to two magnetic transductors. The terminal 2u is connected to the first pair formed by the magnetic transductors 6.3 and 6.6. The terminal 2v is connected to the second pair formed by the magnetic transductors 6.2 and 6.5. The terminal 2w is connected to the third pair formed by the magnetic transductors 6.1 and 6.4.

Among the magnetic transductors of any one pair, e.g. the magnetic transductors referenced 6.1 and 6.4, one of them has one or more first busbars 10.1 and the other one of them has one or more second busbars 10.2. Both of the first and second busbars 10.1 and 10.2 of any one pair of magnetic transductors 6.1 and 6.4 are connected via one end to the same phase winding 5.1, 5.2, 5.3. In FIG. 2B, since the phase windings are not shown, it is merely shown that both of the first and second busbars 10.1, 10.2 of any one pair of magnetic transductors 6.1, 6.4 are connected via one end to the same phase terminal 2w, 2v, 2u. In the example shown in FIGS. 2A, 2B, two first busbars 10.1 are shown in the magnetic transductor 6.1 and two second busbars 10.2 are shown in the magnetic transductor 6.4.

Figure 2C:
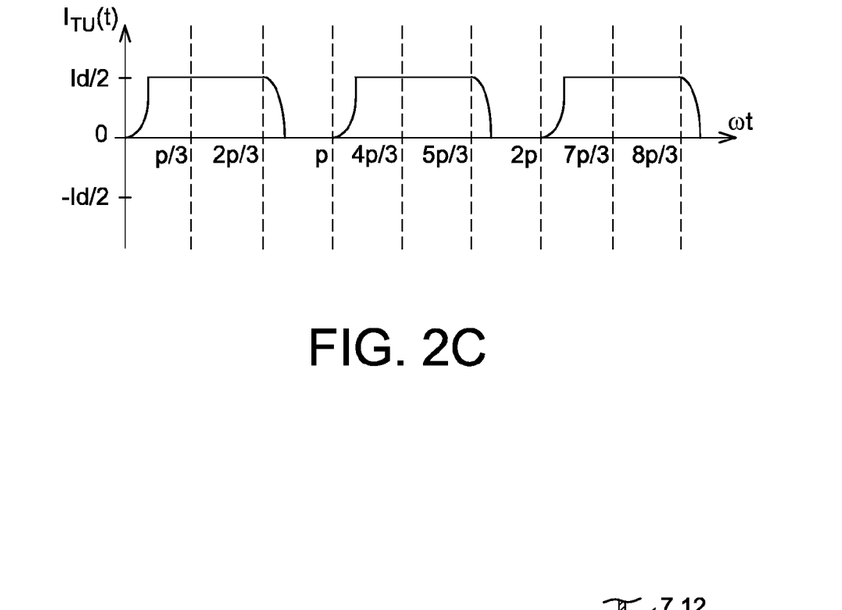
FIG. 2C shows a timing diagram of the current flowing through the busbars of the two groups associated with the phase u of the secondary of the known rectifier transformer.
Figure 2D:
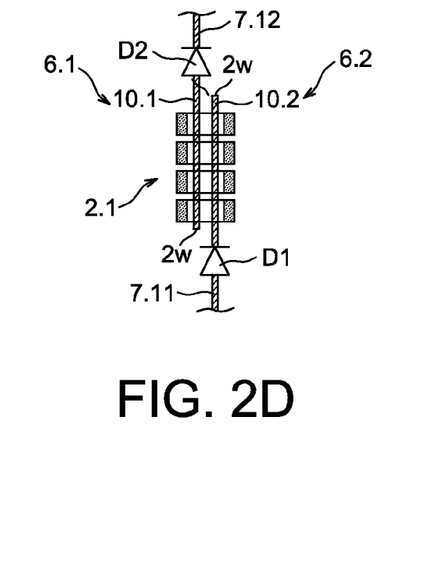
FIGS. 2D, 2E, 2F, 2G show various arrangements for the busbars of one or two groups of busbars associated with the phase w of the secondary of the rectifier transformer of the invention.

In FIG. 2D, in one magnetic transductor 6.1 of the pair, only one first busbar 10.1 is shown, and, in the other magnetic transductor 6.4, only one second busbar 10.2 is shown. This is the simplest configuration.

Figure 2E:
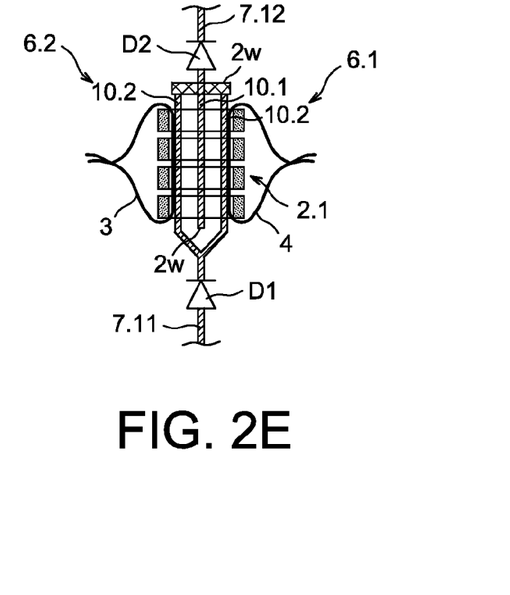

In FIG. 2E, in one magnetic transductor 6.1 of the pair, one first busbar 10.1 is shown, and, in the other magnetic transductor 6.4 of the pair, two second busbars 10.2 are shown. There are not necessarily the same number of first busbars and of second busbars in both of the magnetic transductors in any one pair.

Each first busbar 10.1 of a pair of magnetic transductors is connected via another end to a single positive outlet connection terminal 2u+, 2v+, 2w+ designed to be connected to a positive arm 7.12, 7.22, 7.32 of the rectifier 7. Each second busbar 10.2 of the pair of magnetic transductors is connected via another end to a single negative outlet connection terminal 2u−, 2v−, 2w− designed to be connected to a negative arm 7.11, 7.21, 7.31 of the rectifier 7. The rectifier 7 is configured like the rectifier of FIG. 1C with diodes D1 to D6.

The busbars of the pair of magnetic transductors are distributed in one or more groups of busbars, each group being encircled by a magnetic toroid or by a set of magnetic toroids 2.11, 2.12, 2.21, 2.22, 2.31, 2.32 and comprising at least one first busbar 10.1 and at least one second busbar 10.2. This continues to be with reference to FIGS. 2A and 2B.

FIGS. 2 and 3 show one set of magnetic toroids for each group of busbars, but this is non-limiting.

Thus, when the outlet connection terminals 2u+, 2v+, 2w+ firstly, and 2u−, 2v−, 2w− secondly are short-circuited and when the transformer is fed with AC via its primary 9, two busbars 10.1, 10.2 of the same group, i.e. encircled by the same magnetic toroid or by the same set 2.11, 2.12, 2.21, 2.22, 2.31, 2.32 of magnetic toroids, pass AC in opposite directions. In this situation, since the outlet connection terminals are short-circuited, i.e. connected together, e.g. in the vicinities of the dashed lines of FIG. 2B, the diodes D1 to D6 do not intervene. In the busbar 10.1, the current flows from the terminal 2w+ to the terminal 2w. In the busbar 10.2, the current flows from the terminal 2w to the terminal 2w.

In total, the sum of the currents flowing through the busbars 10.1, 10.2 of the same group in any one direction is substantially equal to the sum of the currents flowing through the busbars of the same group in the other direction. Naturally, if only one busbar passes current in one of the directions, the sum is limited to that current. The induction induced on each magnetic toroid of the set is then very small and the effects of the magnetic toroids are then rendered almost negligible.

In the example shown in FIGS. 2A, 2B, for each phase winding 5.1, 5.2, 5.3, in a group of busbars, one first busbar 10.1 and one second busbar 10.2 are present, but in each magnetic transductor 6.1, 6.2, 6.3, 6.4, there are two first busbars 10.1 and two second busbars 10.2. A group of busbars encircled by a set of magnetic toroids may correspond to busbars belonging to the two magnetic transductors of the pair. In the example shown in FIGS. 2A, 2B, there are two groups of busbars, the second group also having a first busbar 10.1 and a second busbar 10.2, and the set of magnetic toroids bearing the reference 2.12.

In FIG. 2D, the set of magnetic toroids 2.1 encircles a group of busbars formed of a single first busbar 10.1 and of a single second busbar 10.2. The two magnetic transductors include only the two busbars 10.1, 10.2 and the set of magnetic toroids 2.1 that encircle them.

In FIG. 2E, the set of magnetic toroids 2.1 encircles a group of busbars formed of a single first busbar 10.1 and of two second busbars 10.2. The two magnetic transductors include only the three busbars 10.1, 10.2 and the set of magnetic toroids 2.1 that encircle them.

Figure 2F:
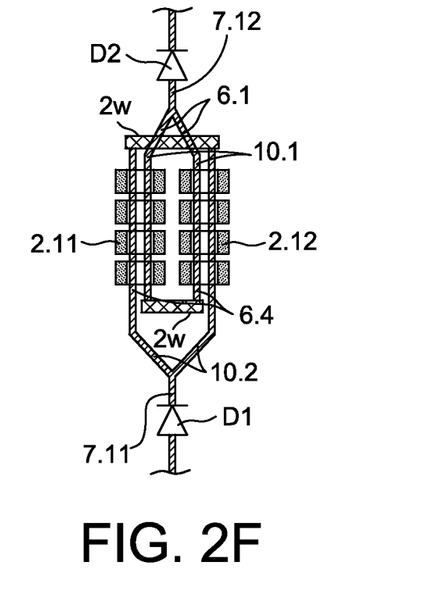
Figure 2G:
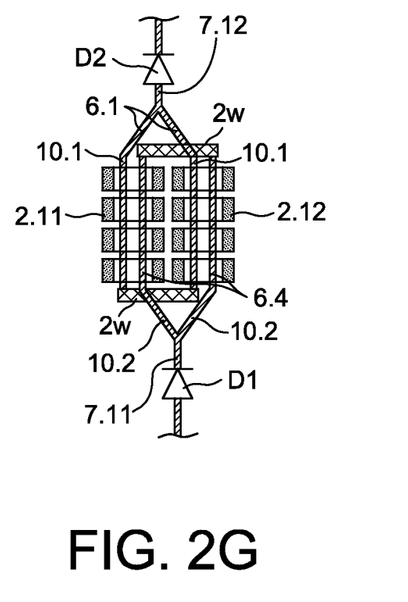

In the example shown in FIGS. 2A, 2B, if consideration is given more particularly to the busbars of the two groups, encircled by the two sets of magnetic toroids 2.11, 2.12, the first busbars 10.1 designed to be connected to the positive arm 7.12 of the rectifier 7 are outside the second busbars 10.2 designed to be connected to the negative arm 7.11. The reverse would have been possible, as shown in FIG. 2F, or else, it would have been possible to place on the outside firstly, on one side, a first busbar 10.1 designed to be connected to a positive arm 7.12 and secondly, on the other side, a second busbar 10.2 designed to be connected to a negative arm 7.11 as in FIG. 2G. In this situation, the first busbars and the second busbars may be said to be interdigitated.

FIG. 2B shows the secondary 5 of the transformer of the invention with its windings 5.1, 5.2, 5.3 and the magnetic transductors that are to be found with it in the tank 8, which is shown diagrammatically by the dashed lines. The following reasoning is used for one phase, namely the phase corresponding to the phase terminal 2w. This phase terminal 2w is connected firstly to one end of the two outer first busbars 10.1 designed to be connected to the same positive arm 7.12 and secondly to one end of the two inner second busbars 10.2 designed to be connected to the same negative arm 7.11. The other end of the two first busbars 10.1 forms the outlet positive connection terminal 2w+ and the other end of the two second busbars 10.2 forms the outlet negative connection terminal 2w−. The outlet connection terminals 2w+, 2w− would be placed on the wall 8.1 of the tank 8 as shown in FIG. 1E.

As shown in FIGS. 1A and 1B, a magnetic toroid, if it is the only one to encircle a group of busbars, or a group of magnetic toroids is equipped with a control circuit 3 and optionally with other circuits including a premagnetization circuit. These circuits are visible in FIG. 2E only.

In operation with the rectifier 7 connected, the sets of magnetic toroids encircling a group of busbars connected to the same phase terminal see, for two-thirds of a period per period, a one-directional current that is almost rectangular and of modulus Id/2. FIG. 2C shows a timing diagram of the current flowing through the busbars of a group, these busbars being connected to the phase terminal 2u.

$$I_T(t)=I_{2u+}(t)/2-I_{2u-}(t)/2$$

When the amplitude Id/2 is sufficiently large, the voltage drop obtained at the outlet of the rectifier is substantially the same as with the conventional example of the FIG. 1, for a group of busbars encircled by a set of magnetic toroids almost identical to the set shown in FIG. 1D and control of the magnetic toroids that is substantially identical.

Figure 3A:
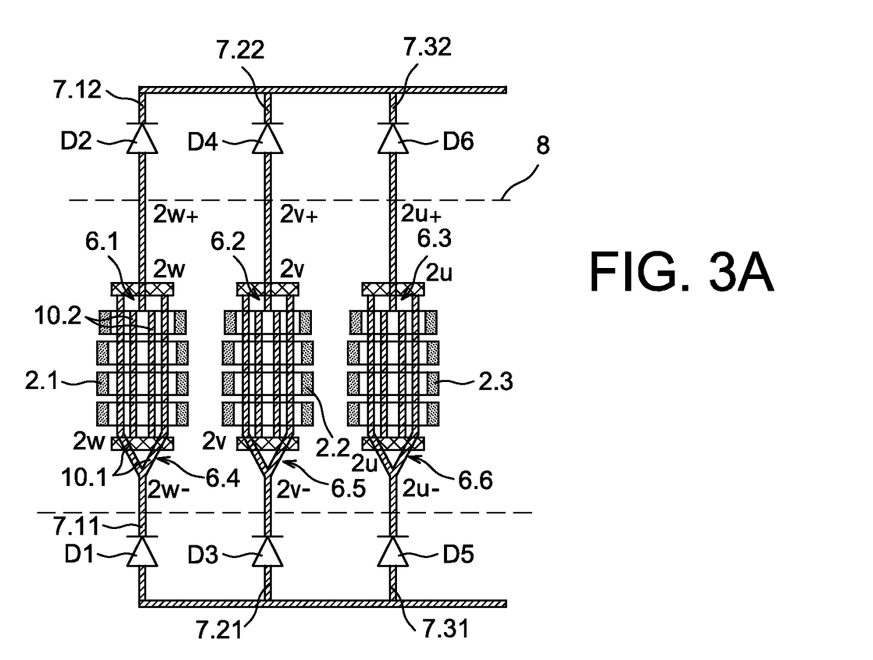
FIGS. 3A and 3B diagrammatically show a variant of how the secondary windings, the magnetic transductors, and the rectifier are connected in a rectifier transformer of the invention.
Figure 3B:
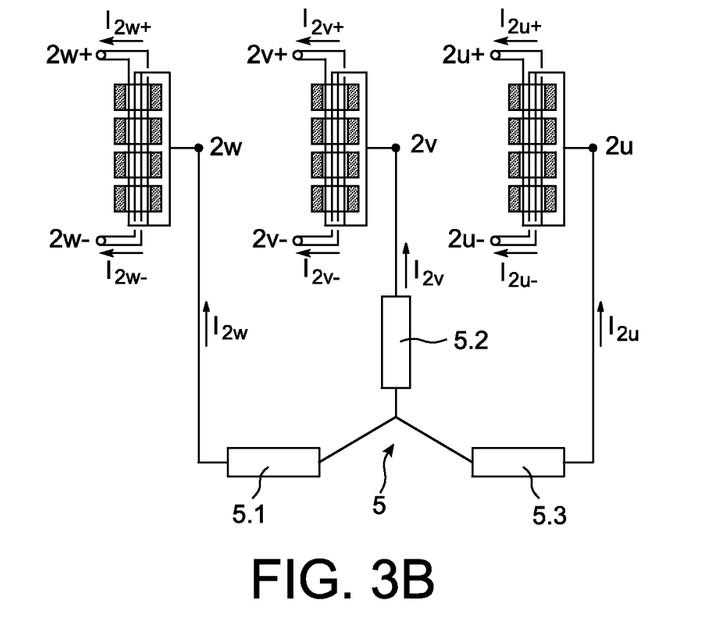

In fragmentary manner, FIGS. 3A and 3B show another example of a transformer of the invention equipped with control magnetic transductors.

In this example, the transformer includes at least one three-phase secondary 5 having its three windings 5.1, 5.2, 5.3 arranged in a star configuration. Each of the three windings 5.1, 5.2, 5.3 has one end in common (not referenced) and another end forming a respective phase outlet 2u, 2v, 2w.

In this example, each phase terminal 2u, 2v, 2w is connected to a pair of magnetic transductors 6.1, 6.4; 6.2, 6.5; 6.3; 6.6, the magnetic transductors of the pair sharing one or more common magnetic toroids, and, in the example shown in the FIG. 3, one common set of magnetic toroids 2.1, 2.2, 2.3.

As above, the pair of magnetic transductors 6.1, 6.4; 6.2, 6.5; 6.3, 6.6 has one or more first busbars 10.1 and one or more second busbars 10.2. Each of the first and second busbars 10.1 and 10.2 of the pair is connected via a first end to the same phase winding 2u, 2v, 2w.

Each of the first busbars 10.1 of a pair of magnetic transductors 6.1, 6.4; 6.2, 6.5; 6.3, 6.6 is connected via another end to a single positive outlet connection terminal 2u+, 2v+, 2w+ designed to be connected to a positive arm 7.12, 7.22, 7.32 of the rectifier 7. Each of the second busbars 10.2 of a pair of magnetic transductors 6.1, 6.4; 6.2, 6.5; 6.3, 6.6 is connected via another end to a single negative outlet connection terminal 2u−, 2v−, 2w− designed to be connected to a negative arm 7.11, 7.21, 7.31 of the rectifier 7.

In a pair of magnetic transductors 6.1, 6.4; 6.2, 6.5; 6.3, 6.6, the first busbars 10.1 are connected in parallel, and the same applies for the second busbars 10.2.

In FIG. 3A, starting from the phase terminal 2w, for example, there are two second busbars 10.2 connected in parallel between the phase terminal 2w and the negative outlet connection terminal 2w−. In the same way, there are two first busbars 10.1 connected in parallel between the phase terminal 2w and the positive outlet connection terminal 2w+.

The same connection configuration is to be found with other first busbars and other second busbars.

In this example, the first busbars 10.1 and the second busbars 10.2 of the pair of magnetic transductors 6.1, 6.4; 6.2, 6.5; 6.3, 6.6, i.e. the busbars that are connected to the same phase terminal, belong to the same group. This means that they are encircled by the same set of magnetic toroids 2.1, 2.2, 2.3. As can be seen in FIG. 3A, in this group of busbars, two first busbars 10.1 are further away from the magnetic toroids 2.1, 2.2, 2.3 and two second busbars 10.2 are closer to the magnetic toroids 2.1, 2.2, 2.3.

Figure 3C:
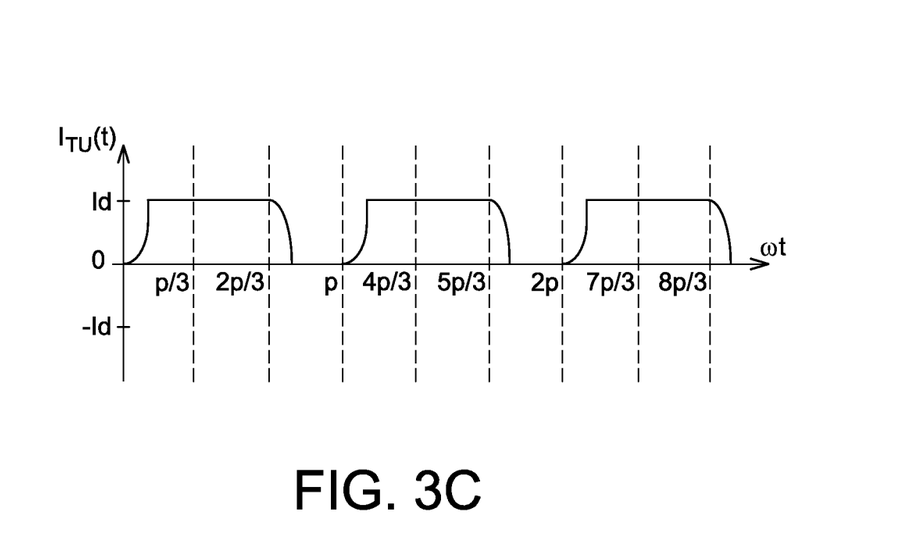
FIG. 3C shows a timing diagram of the current flowing through the busbars of the two groups associated with the phase u of the secondary of the rectifier transformer of the invention.
Figure 3D:
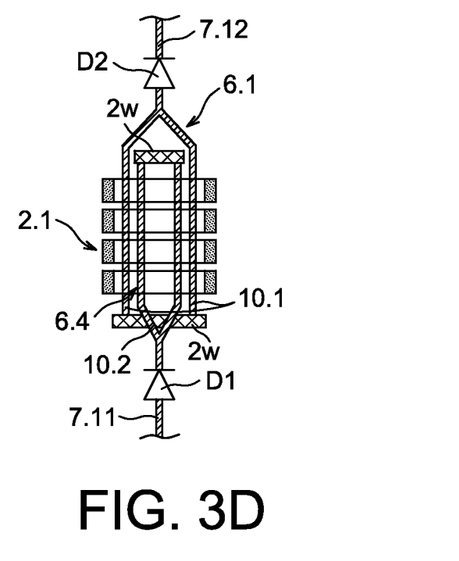
FIGS. 3D and 3E show various arrangements for the busbars of a group of busbars associated with the phase w of the secondary of the known rectifier transformer.
Figure 3E:
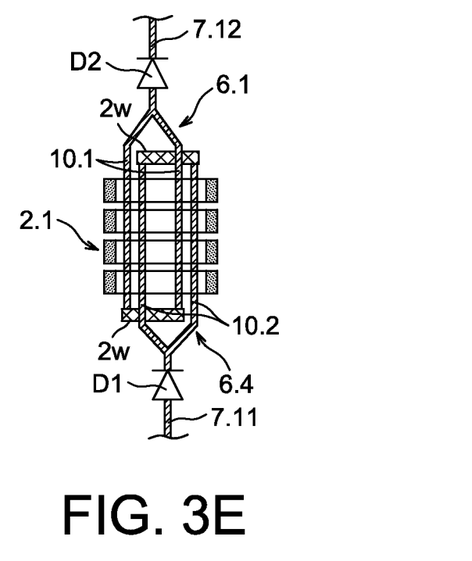

The reverse situation can be observed in FIG. 3D, in which it is the two second busbars 10.2 that are further away from the magnetic toroids 2.1, and the two first busbars 10.1 that are closer to the magnetic toroids 2.1. In yet another variant, as shown in FIG. 3E, the first busbars 10.1 and the second busbars 10.2 are disposed in alternation. One of the first busbars 10.1 is close to the magnetic toroids 2.1 and the other is further away therefrom. The same applies for the second busbars 10.2.

FIG. 3B shows the connection configuration between the magnetic transductors and the windings 5.1, 5.2, 5.3 of the secondary 5. The windings 5.1, 5.2, 5.3 of the secondary 5 are connected in a star configuration. Each winding has one end in common with the other windings of the secondary and another end forming a respective phase terminal 2u, 2v, 2w.

In this embodiment, a magnetic toroid, if it is the only one to encircle a group of busbars, or a group of magnetic toroids is equipped with at least one control circuit and optionally with other circuits including a premagnetization circuit. These circuits are similar to the circuits shown in FIGS. 1A and 1B, and they are not shown in the FIG. 3 so as not to clutter the figures.

The number of busbars in a magnetic transductor may be greater than two. In a group of busbars, the number of first busbars may be different from the number of second busbars.

However, provision is made for the difference between the number of first busbars and the number of second busbars to be less than two.

In this example, when the outlet connection terminals 2w+, 2w−, 2v+, 2v−, 2u+, 2u− are short-circuited, which makes it possible to perform the short-circuit tests, in a group of busbars encircled with one or more magnetic toroids, the currents flow through two busbars designed to be connected one to a positive arm and the other to a negative arm of the rectifier in opposite directions at any instant. These currents are of substantially equal modulus, insofar as, in the group of busbars, there are as many first busbars as second busbars. The effects of these currents on the magnetic toroids cancel out. If there are not the same number of first busbars and of second busbars in a group of busbars, the induction induced on each magnetic toroid of the set is always small and, as a result, the effects of the magnetic toroids are then rendered almost negligible.

In operation with the rectifier connected, each group of busbars encircled by a set of magnetic toroids sees, for two-thirds of a period per period, a one-directional current that is almost rectangular and of modulus Id. FIG. 3C shows a timing diagram of the current flowing through the busbars of the same group.

$$I_T(t) = I_{2u+}(t)/2 - I_{2u-}(t)/2$$

When the amplitude Id is sufficiently large, the voltage drop obtained at the outlet of the rectifier is substantially the same as with the conventional example of the FIG. 1, for a group of busbars encircled by a set of magnetic toroids almost identical to the set shown in FIG. 1D and control of the magnetic toroids that is substantially identical.

The advantage of the transformer of the invention equipped with magnetic transductors is that the qualification testing of the transformer can be performed with the magnetic toroids mounted and with the tank full of dielectric cooling fluid, and in particular in compliance with the recommendations of international standard IEC 60076-1.

The qualification testing can be performed on a testing platform, thereby avoiding disturbances due to partial tests in the assembly workshop.

All of the qualification testing for the transformer can be performed in one go to the satisfaction of the parties accepting the transformer who are present at the tests.

In the factory that manufactures the transformers, scheduling the tests is simplified, making it possible for the tests to take place more smoothly and reducing the bottleneck at the testing platform.

The time taken for the qualification testing of the transformer is reduced significantly. The lead time for delivering a series of transformers designed for the same application, such as aluminum electrolysis, is reduced by about one twelfth.

In the configuration of the FIG. 3, the number of magnetic toroids is halved compared with the configuration of the FIG. 1, because, for any one phase, there is only one magnetic toroid or one set of magnetic toroids for all of the busbars connected to the same phase terminal.

The mass and the volume of the magnetic toroids are almost halved. The space saved is significant and should lead to a reduction in the size of the tank of the transformer.

In the two configurations of the invention, the frequency of the induction in the magnetic toroids is doubled compared with the conventional solution shown in the FIG. 1. However, the losses and the noise generated might be increased compared with the conventional configuration.

Although several embodiments of the present invention have been shown and described in detail, it can be understood that various changes and modifications may be made without going beyond the ambit of the invention.

The invention claimed is:

1. A rectifier transformer including, in a tank, at least one primary, at least one secondary with phase windings, one pair of magnetic transductors per phase winding, one of the transductors having one or more first busbars and the other having one or more second busbars, all of the first and second busbars of the pair of transductors being connected via one end to the same phase winding, the first busbar or each first busbar being connected via another end to a single positive outlet connection terminal (2w+) designed to be connected to a positive arm of the rectifier, the second busbar or each second busbar being connected via another end to a single negative outlet connection terminal (2w−) designed to be connected to a negative arm of the rectifier, said rectifier transformer being characterized in that all of the busbars of the pair of magnetic transductors form one or more groups, each group being encircled by a magnetic toroid, or by a set of magnetic toroids and comprising one or more first busbars and one or more second busbars in such a manner that when the outlet connection terminals are short-circuited and when the transformer is being fed with AC via its primary, the busbars of a group pass currents of opposite directions such that the current or the sum of the currents in one direction is substantially equal to the current or to the sum of the currents in the other direction.

2. The rectifier transformer according to claim 1, wherein when there are a plurality of first busbars and/or a plurality of second busbars in the pair of magnetic transductors, the first busbars are connected in parallel and/or the second busbars are connected in parallel.

3. The rectifier transformer according to claim 1, wherein in the pair of magnetic transductors, the number of first busbars is equal to the number of second busbars or indeed the number of first busbars is different from the number of second busbars.

4. The rectifier transformer according to claim 1, wherein in a group of busbars encircled by a magnetic toroid or by a set of magnetic toroids, the first busbars are closer to said magnetic toroid or to the magnetic toroids of said set of magnetic toroids than the second busbar or each second busbar.

5. The rectifier transformer according to claim 1, wherein in a group of busbars encircled by a magnetic toroid or by a set of magnetic toroids, the second busbars encircled by said magnetic toroid or by said set of magnetic toroids are closer to said magnetic toroid or to the magnetic toroids of said set of magnetic toroids than the first busbar or each first busbar.

6. The rectifier transformer according to claim 1, wherein a first busbar or a second busbar of a group is interposed between two second busbars or two first busbars of the group.

7. The rectifier transformer according to claim 1, wherein two first busbars or two second busbars of the same magnetic transductor are encircled by distinct magnetic toroids or by distinct sets of magnetic toroids.

8. The rectifier transformer according to claim 1, wherein the three windings of the secondary are connected in a delta configuration or in a star configuration.

9. The rectifier transformer according to claim 1, wherein the or each first busbar and the or each second busbar are arranged substantially vertically in the tank.

10. The rectifier transformer according to claim 1, wherein the first busbar or each first busbar and the second busbar or each second busbar are arranged substantially horizontally in the tank.

11. The rectifier transformer according to claim 1, wherein at least one conductive control loop surrounds the magnetic toroid or all of the magnetic toroids of the set of magnetic toroids.

12. The rectifier transformer according to claim 1, wherein at least one conductive premagnetization loop surrounds the magnetic toroid or all of the magnetic toroids of the set of magnetic toroids.

* * * * *